Dec. 5, 1967 R. ALTSON 3,356,428
ROLLER BEARING CAGE
Filed March 11, 1966

INVENTOR.
Ralph Altson
BY
F. J. Fodale
ATTORNEY 3,356,428
ROLLER BEARING CAGE
Ralph Altson, East Orange, N.J., assignor to General Motors Corporation, Detroit, Mich., a corporation of Delaware
Filed Mar. 11, 1966, Ser. No. 533,703
5 Claims. (Cl. 308—217)

My invention relates generally to roller bearings and more particularly to so-called package roller bearings which comprise a single race and rollers retained in unit handling assembly therewith by a cage. Such package bearings are used for direct assembly applications, for instance, onto a shaft which provides the other or, in this case, the inner race.

As is common practice, the rollers are retained by having the circumferential width of the cage windows on the side of the bearing pitch diameter opposite to the supplied race less than the roller diameter. In one method of assembling package roller bearings, the cage is first mounted to the race. The rollers are subsequently individually snapped into the windows for retention between the cage and the race with the cross bars yielding sufficiently to allow the roller to pass through the restriction formed by the retaining edges on the cross bars. One problem, however, with this method of assembly is that the yielding of the cross bars in small diameter or thin cages may stress them beyond the elastic limit of the cross bar material resulting in permanent deformation which is obviously undesirable.

Another problem is associated with cages which are fabricated by punching the windows in a flat strip stock, rolling the flat strip into a cylinder and welding the abutting ends. In this type of fabrication, the originally perpendicular side walls on the cross bars are radial after the punched strip is rolled so that circumferential width of the windows decreases radially inwardly. Such fabrication, I have found results in either too loose a fit of the rollers within the windows (too great a running clearance) or excessive retention by the retaining edges of the cross bars. The excessive retention aggravates the problem of permanent deformation previously discussed in connection with thin or small diameter cages. Since the above-described method of assembly and method of manufacture of the cages are economically desirable, it is the general object of my invention to design a package bearing having a cage capable of manufacture by the above techniques and capable of assembly by the above method in which the cross bars provide an adequate but not excessive running clearance and also sufficient retention without harmful deformation to thin and small cages alike.

The exact nature of this invention as well as other objects and advantages thereof will be readily apparent from consideration of the following specification relating to the annexed drawing in which.

Figure 1:
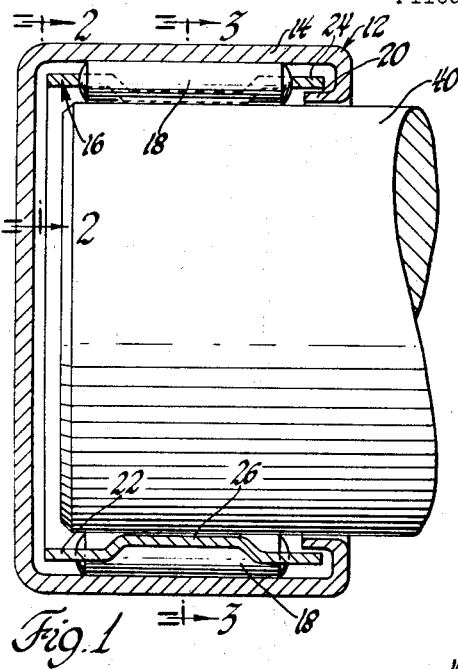
FIGURE 1 is a view partially in cross section taken along the longitudinal axis of a package roller bearing in accordance with my invention.

Referring now to the drawings and more particularly to FIGURE 1, I have shown a typical package bearing 12 comprising a cupped outer race 14, a cage 16, and a number of circumferentially spaced rollers 18. It is to be understood that while I have illustrated a cupped race for the purpose of disclosing a specific embodiment of my invention, that an annular type race open at both ends is equally useable. The cage 16 is retained within the cupped race 14 by an inturned flange 20 on the right hand side of the race as viewed in FIGURE 1. The assembly above described is of the unit handled type which is to say that the cage 16 and rollers 18 are inseparably mounted to the race 14. The cage 16 thus both circumferentially spaces the rollers 18 and retains them in assembly with the race 14.

Figure 4:
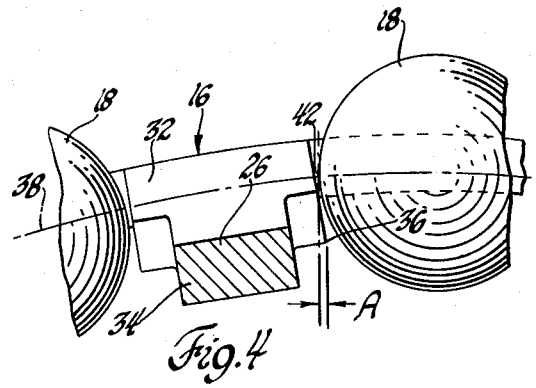
FIGURE 4 is an enlarged view of a portion of FIGURE 3.
Figure 3:
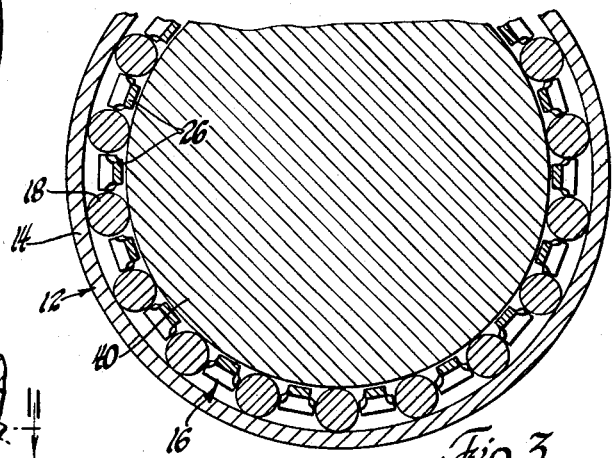
FIGURE 3 is a section taken along the line 3—3 of FIGURE 1 and looking in the direction of the arrows.
Figure 2:
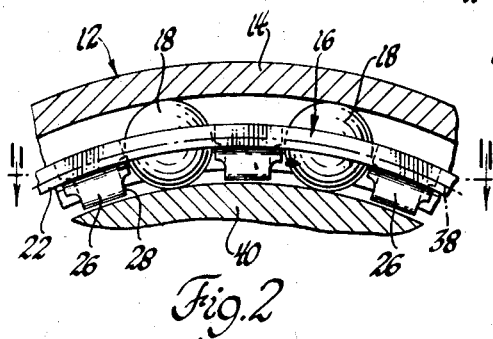
FIGURE 2 is a section taken along the line 2—2 of FIGURE 1 and looking in the direction of the arrows.
Figure 6:
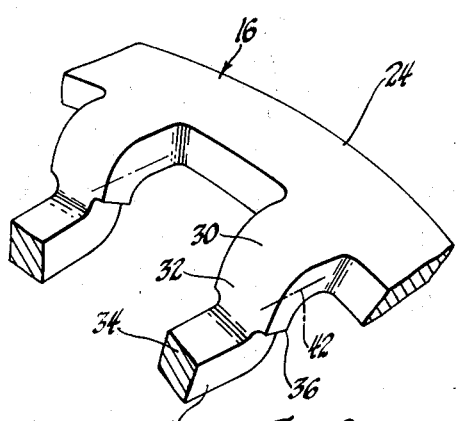
FIGURE 6 is an enlarged view of a portion of FIGURE 5.
Figure 5:
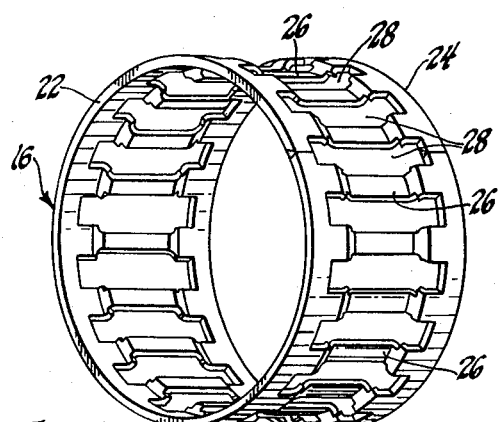
FIGURE 5 is a perspective view of the cage shown in FIGURE 1.

Referring now to FIGURES 5 and 6, the cage 16 is seen to comprise a pair of axially spaced end rings 22 and 24 with a number of cross bars 26 extending therebetween to form roller receiving windows 28 which are to space and retain the rollers 18. To this end, each cross bar 26 comprises axial end portions 30, intermediate radial portions 32, and a depressed central portion 34. In manufacturing the cage, the windows 28 are stamped from a flat piece of stock so that the central portions 34 are narrower than the outer portions 30 and intermediate portions 32. The cross bars are then bent to form and the strip rolled into a cylinder and the abutting ends welded. Also it is feasible to first roll and weld the cage and then bend the cross bars to shape. In either event, the perpendicular side walls of the cross bars are now radial so that the windows 28 decrease in circumferential length in the radially inwardly direction. This tapering inwardly, however, enables the cross bars to perform their dual function, that is, to provide a running clearance for the rollers 18 within the windows 16 and to provide retention for the rollers 18. This is generally accomplished by having the width of the windows at the bearing pitch diameter 38 slightly greater than the roller diameter and the width of the windows at some point on the side of the pitch diameter opposite the race 14 less than the roller diameter. This condition is illustrated in FIGURE 4 where it is seen that the lower edge 36 of the intermediate portion 32 of the cross bar 26 enters into the projected diameter of the roller by a distance A. As is apparent from FIGURE 4, the greater the radial inward displacement of the cross bars 26 from the pitch diameter 38, the greater the retainment since the edge 36 extends further into the projected area of the roller. Thus by taking a cage with cross bars which provide a running clearance for the rollers and bending the cross bars inwardly, I can provide a retaining edge such as 36, the amount of inward bending depending upon the retainment desired. I have found, however, that in thin or small size bearings that the retention becomes too great if the cross bars 26 are made of uniform width. Consequently, I have relieved the central portion 34 of the cross bars so that the only retention is provided by the radial edges 36 on the portions 32 of the cross bars 26. The running clearance between the rollers 18 and the cross bars 26 is provided by the axial end portions 30 of the cross bars; the roller contact line being indicated at 42 in FIGURE 6. In addition, the undercutting or relieving of the central portion 34 allows me to depress them far enough so that their radial inner surfaces lie in the same cylindrical surface as the radial inner lines on the rollers 18. Thus when the bearing 12 is assembled onto a shaft such as 40, the portions 26 will ride on the shaft and center the cage 16 and thus the bearing 12 with respect to it. See FIGURES 4 and 6.

Referring back to FIGURE 1, the package bearing is assembled by first placing the cage 16 within the cupped race 14 and then bending the flange inwardly to retain the cage 16 within the race 14. The rollers 18 are then snapped into position individually. The resiliency of the cage allows the cross bars to yield sufficiently so that the rollers may be snapped past the retaining edges 36 which then prevent the rollers from falling out of the assembly.

Thus it can be seen that I have provided a package bearing capable of manufacture and assembly by the aforementioned techniques in which the cage provides adequate running clearance, sufficient retention and centering without harmful deformation to thin and small diameter cages alike.

I claim:

1. A roller bearing comprising in combination, a generally cylindrical race, a cage disposed in and radially spaced from said race, said cage comprising a pair of axially spaced end rings and a plurality of equally circumferentially spaced cross bars extending between said end rings to form windows, each of said cross bars having axial end portions, intermediate generally radial portions continuous with said end portions and a central portion spaced radially from said end portions on the side of the pitch diameter of said bearing opposite said race and connected to said end portions by said intermediate portions, said central portions being less in circumferential length than said end and intermediate portions, means on said race to retain said cage, a plurality of rollers, one of said rollers being disposed in each of said windows, said rollers being in line contact with the side walls of said cross bars and being retained in assembly with said race and cage by said radial portions.

2. The roller bearing as defined in claim 1 wherein said end and intermediate portions are of substantially uniform cross section.

3. The roller bearing as defined in claim 2 wherein said cage retaining means includes an inturned flange on said race disposed within said race.

4. The roller bearing as defined in claim 2 wherein the radial inner walls of said central portions and the radial inner lines of said rollers lie in substantially the same cylindrical surface.

5. A roller bearing cage comprising a pair of axially spaced end rings and a plurality of equally circumferentially spaced cross bars extending therebetween to form windows, each of said cross bars having axial end portions, generally radial intermediate portions continuous with said end portions and a central depressed portion connected to said end portions by said intermediate portions, said end and intermediate portions being of substantially uniform cross section and said central portions being less in circumferential length than said end and intermediate portions.

References Cited

UNITED STATES PATENTS 2,894,791    7/1959    White et al. _____ 308—217

EDGAR W. GEOGHEGAN, *Primary Examiner.*

FRANK SUSKO, *Examiner.*